(12) United States Patent
Ribarich

(10) Patent No.: US 7,420,338 B2
(45) Date of Patent: Sep. 2, 2008

(54) BALLAST CONTROL IC WITH MINIMAL INTERNAL AND EXTERNAL COMPONENTS

(75) Inventor: Thomas J Ribarich, Laguna Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 473 days.

(21) Appl. No.: 10/899,622

(22) Filed: Jul. 27, 2004

(65) Prior Publication Data

US 2005/0007037 A1    Jan. 13, 2005

Related U.S. Application Data

(62) Division of application No. 10/337,738, filed on Jan. 7, 2003, now Pat. No. 7,019,471, which is a division of application No. 09/883,397, filed on Jun. 19, 2001, now Pat. No. 6,525,492.

(60) Provisional application No. 60/212,643, filed on Jun. 19, 2000.

(51) Int. Cl.
*H05B 37/02* (2006.01)
(52) U.S. Cl. ........................ 315/309; 315/360
(58) Field of Classification Search ................. 315/291, 315/209 R, 224–225, 307–309, 209 CD, 315/219, 360
See application file for complete search history.

(56) References Cited

U.S. PATENT DOCUMENTS 4,160,235 A    7/1979    Krumrein    ............... 315/200 A

| | | | |
|---|---|---|---|
| 4,434,388 A | 2/1984 | Carver et al. | ................. 315/307 |
| 4,593,232 A | 6/1986 | McEdwards | |
| 4,866,350 A | 9/1989 | Counts | |
| 5,049,790 A | 9/1991 | Herfurth et al. | |
| 5,144,117 A | 9/1992 | Hasegawa et al. | ............ 235/455 |
| 5,170,099 A * | 12/1992 | Ueoka et al. | ................. 315/224 |
| 5,277,497 A | 1/1994 | Enomoto | .................... 377/114 |

(Continued)

FOREIGN PATENT DOCUMENTS

DE        2451886        10/1974

(Continued)

OTHER PUBLICATIONS

Alonso, et al., "A Microcontroller-BAsed Emergency Ballast for Fluorescent Lamps." IEEE Transactions on Industrial Electronics, vol. 44, No. 2, pp. 207-216 (Apr. 1997).
de Keyser, et al., "Modelling, Identification and Simulation of a Lighting Control System,"The Annals of "Dunarea De Jos" University of Galati, Fascicle III, ISSN 1221-454C, pp. 115-120 (2002).

*Primary Examiner*—Thuy Vinh Tran
*Assistant Examiner*—Tung X Le
(74) *Attorney, Agent, or Firm*—Ostrolenk, Faber, Gerb & Soffen, LLP

(57) ABSTRACT

A ballast controller integrated circuit which executes a specific set of instructions via an integrated state diagram architecture to control a fluorescent lamp or high intensity discharge lamp and protect the ballast. The state diagram architecture controls powering up and down of the IC and the half-bridge circuit driven by the IC, preheating and striking of the lamp, running of the lamp, sensing for numerous possible fault conditions, and recovering from these fault conditions based on the normal maintenance of a lamp, while requiring fewer internal and external components than previous electronic ballasts.

10 Claims, 6 Drawing Sheets

U.S. PATENT DOCUMENTS

| | | | |
|---|---|---|---|
| 5,349,623 A * | 9/1994 | Itoh | 377/75 |
| 5,479,074 A | 12/1995 | Nilssen | |
| 5,508,664 A | 4/1996 | Rizzo | 331/111 |
| 5,510,681 A | 4/1996 | Nilssen | |
| 5,638,031 A | 6/1997 | Danstrom | 331/111 |
| 5,696,431 A * | 12/1997 | Giannopoulos et al. | 315/308 |
| 5,742,134 A * | 4/1998 | Wacyk et al. | 315/307 |
| 5,770,979 A | 6/1998 | Kolanko et al. | 331/111 |
| 5,838,117 A * | 11/1998 | Nerone | 315/307 |
| 5,859,504 A | 1/1999 | Nerone | |
| 5,932,974 A | 8/1999 | Wood | 315/119 |
| 5,969,483 A | 10/1999 | Li et al. | |
| 6,002,210 A | 12/1999 | Nilssen | |
| 6,008,593 A | 12/1999 | Ribarich | 315/307 |
| 6,011,357 A * | 1/2000 | Gradzki et al. | 315/224 |
| 6,031,342 A | 2/2000 | Ribarich et al. | 315/291 |
| 6,118,228 A | 9/2000 | Pal | |
| 6,175,195 B1 * | 1/2001 | Janczak et al. | 315/194 |
| 6,181,087 B1 * | 1/2001 | Hamaguchi et al. | 315/308 |
| 6,198,231 B1 | 3/2001 | Schemmel et al. | |
| 6,211,623 B1 * | 4/2001 | Wilhelm et al. | 315/224 |
| 6,228,500 B1 | 5/2001 | Hiroshige et al. | |
| 6,285,138 B1 * | 9/2001 | Kataoka et al. | 315/291 |
| 6,525,492 B2 | 2/2003 | Ribarich | 315/291 |
| 2002/0140371 A1 * | 10/2002 | Chou et al. | 315/224 |
| 2005/0093475 A1 * | 5/2005 | Kuennen et al. | 315/209 R |

FOREIGN PATENT DOCUMENTS

| | | | |
|---|---|---|---|
| DE | 199 00 153 | 7/1999 | |
| EP | 0 059 064 | 9/1982 | |
| FR | 2273651 | 7/1999 | |
| GB | 1 409 104 | 10/1975 | |
| GB | 2332993 | 7/1999 | 188/32 |
| WO | 83/02537 | 7/1983 | |

* cited by examiner

BALLAST CONTROL IC WITH MINIMAL INTERNAL AND EXTERNAL COMPONENTS

CROSS REFERENCE TO RELATED APPLICATIONS

This application is a divisional of U.S. patent application Ser. No. 10/337,738, filed Jan. 7, 2003 and entitled BALLAST CONTROL IC WITH MINIMAL INTERNAL AND EXTERNAL COMPONENTS, which is a divisional of U.S. patent application Ser. No. 09/883,397, filed Jun. 19, 2001 and entitled "BALLAST CONTROL IC WITH MINIMAL INTERNAL AND EXTERNAL COMPONENTS" which application claims the benefit of U.S. Provisional Application No. 60/212,643, filed Jun. 19, 2000.

BACKGROUND OF THE INVENTION

1. Field of the Invention

The present invention relates to an electronic ballast for controlling fluorescent or high-intensity discharge lamps, and more particularly, to an electronic ballast that requires fewer internal and external components.

2. Description of the Related Art

Electronic ballasts for controlling fluorescent or high-intensity discharge (HID) lamps usually require electronics necessary for preheating the lamp filaments, striking the lamp, driving the lamp to a given power, detecting lamp fault conditions, and safely deactivating the circuit.

Electronic ballasts for gas discharge circuits have recently come into widespread use because of the availability of power MOSFET switching devices and insulated gate bipolar transistors ("IGBTs") that can replace previously used power bipolar switching devices. Monolithic gate driver circuits, such as the IR2155 sold by International Rectifier Corporation and described in U.S. Pat. No. 5,545,955, the disclosure of which is incorporated herein by reference in its entirety, have been devised for driving the power MOSFETs or IGBTs in electronic ballasts.

The IR2155 gate driver IC offers significant advantages over prior circuits: The driver is packaged in a conventional DIP or SOIC package. The package contains internal level shifting circuitry, under voltage lockout circuitry, deadtime delay circuitry, and additional logic circuitry and inputs so that the driver can self-oscillate at a frequency determined by external resistors RT and capacitors CT.

Although the IR2155 offers a vast improvement over prior ballast control circuits, it lacks a number of desirable features such as the following: (i) a start-up procedure which ensures a flash-free start without an initial high voltage pulse across the lamp, (ii) non-zero voltage switching protection circuitry, (iii) over-temperature shutdown circuitry, (iv) DC bus and AC on/off control circuitry, and (v) near or below resonance detection circuitry.

U.S. Pat. No. 6,211,623 to Wilhelm et al. issued Apr. 3, 2001 and having common assignment with the present application discloses an electronic ballast which addresses limitations of the IR2155, such as those discussed above. The electronic ballast is identified by the assignee, International Rectifier Corporation, as the IR2157.

The ballast control circuit of the '623 patent, as in commonly known ballasts, requires an implementation of the preheat timer that includes a comparator for comparing the CPH pin against a fixed threshold. In addition, the oscillator circuit requires more than one comparator. These and other configuration details result in additional components being required both inside and outside the chip. Accordingly, the prior art could be improved upon by providing a ballast control IC which performs the primary ballast functions while minimizing the internal and external component count. Applications for such ballasts would include linear fluorescent lamps, compact fluorescent lamps (CFL), cold-cathode fluorescent lamps (CCFL), high-intensity discharge (HID) lamps, and flat fluorescent lamps.

SUMMARY OF THE INVENTION

The present invention overcomes the deficiencies of the prior art, such as those described above, by providing an electronic ballast that utilizes fewer comparators and combines the functionality of sub-circuits, thereby reducing the number of internal and external components required.

More specifically, the chip of the present invention includes an oscillator circuit that advantageously requires only one comparator circuit. In addition, a lamp preheat circuit uses a preheat resistor parallel to the timing resistor to program preheat frequency, and the voltage at the gate of a MOSFET switch is ramped to gradually disconnect the preheat pin (and thus the preheat resistor) from the frequency timing input. Also, the preheat circuit ramp is utilized as a ramp for lamp ignition as well, thus saving on circuit components. Further, the preheat capacitor input is used as a convenient delay for connecting a DC bus sensing resistor to a DC bus sensing input.

The integrated circuit of the present invention includes circuitry for performing the following functions: micropower start-up current, programmable preheat frequency, programmable ignition-current or over-current, programmable preheat time, programmable ignition ramp, programmable running or minimum frequency, programmable deadtime, programmable low DC bus frequency-shift reset, external shutdown pin, and high-and low-side 600V half-bridge driver outputs for driving two MOSFETs or IGBTs connected in a classic totem-pole configuration.

Other features and advantages of the present invention will become apparent from the following description of the invention which refers to the accompanying drawings.

DETAILED DESCRIPTION OF EMBODIMENTS OF THE INVENTION

Figure 1:
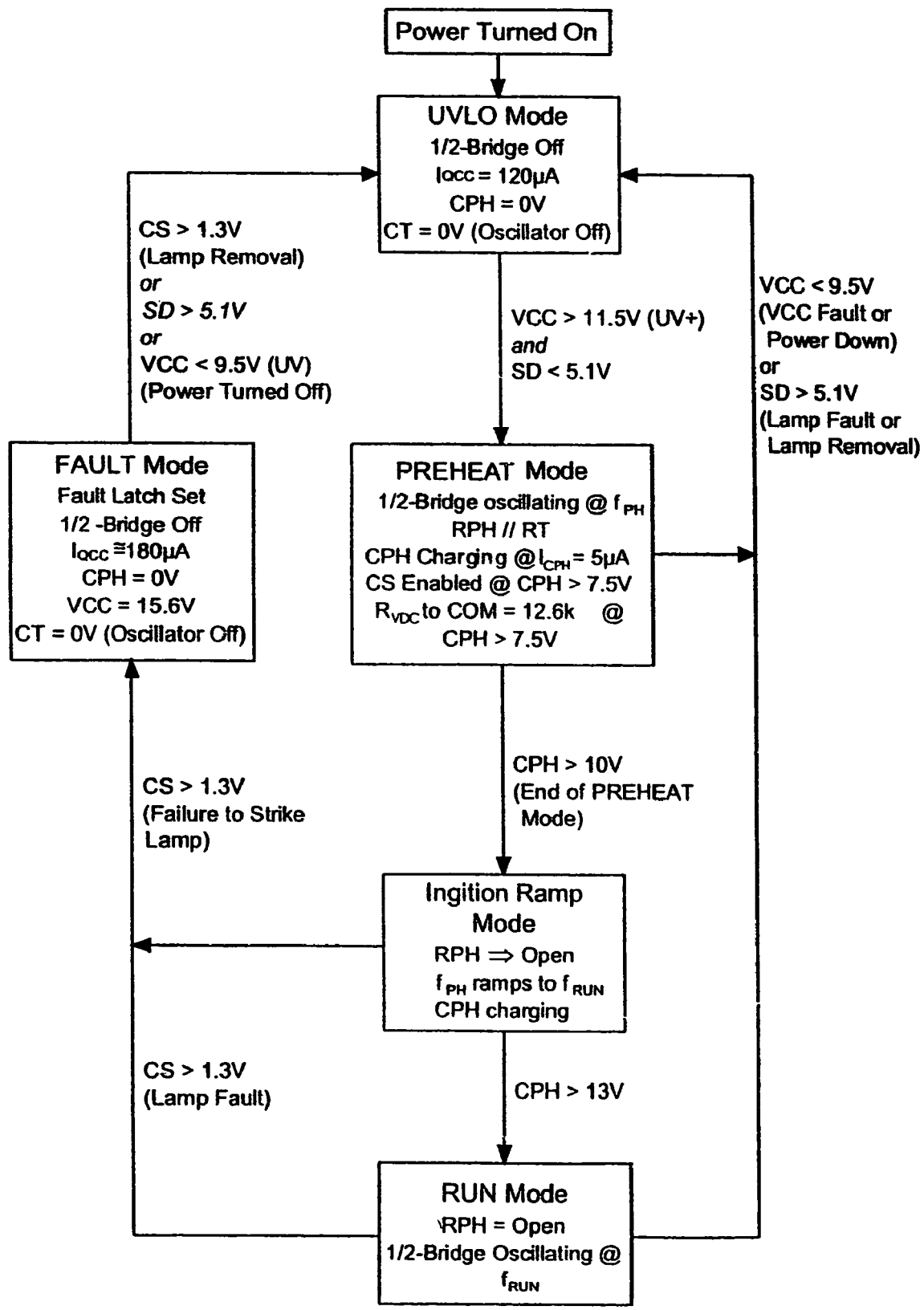
FIG. 1 is a state diagram showing the functionality incorporated into a ballast control integrated circuit according to the present invention.
Figure 2:
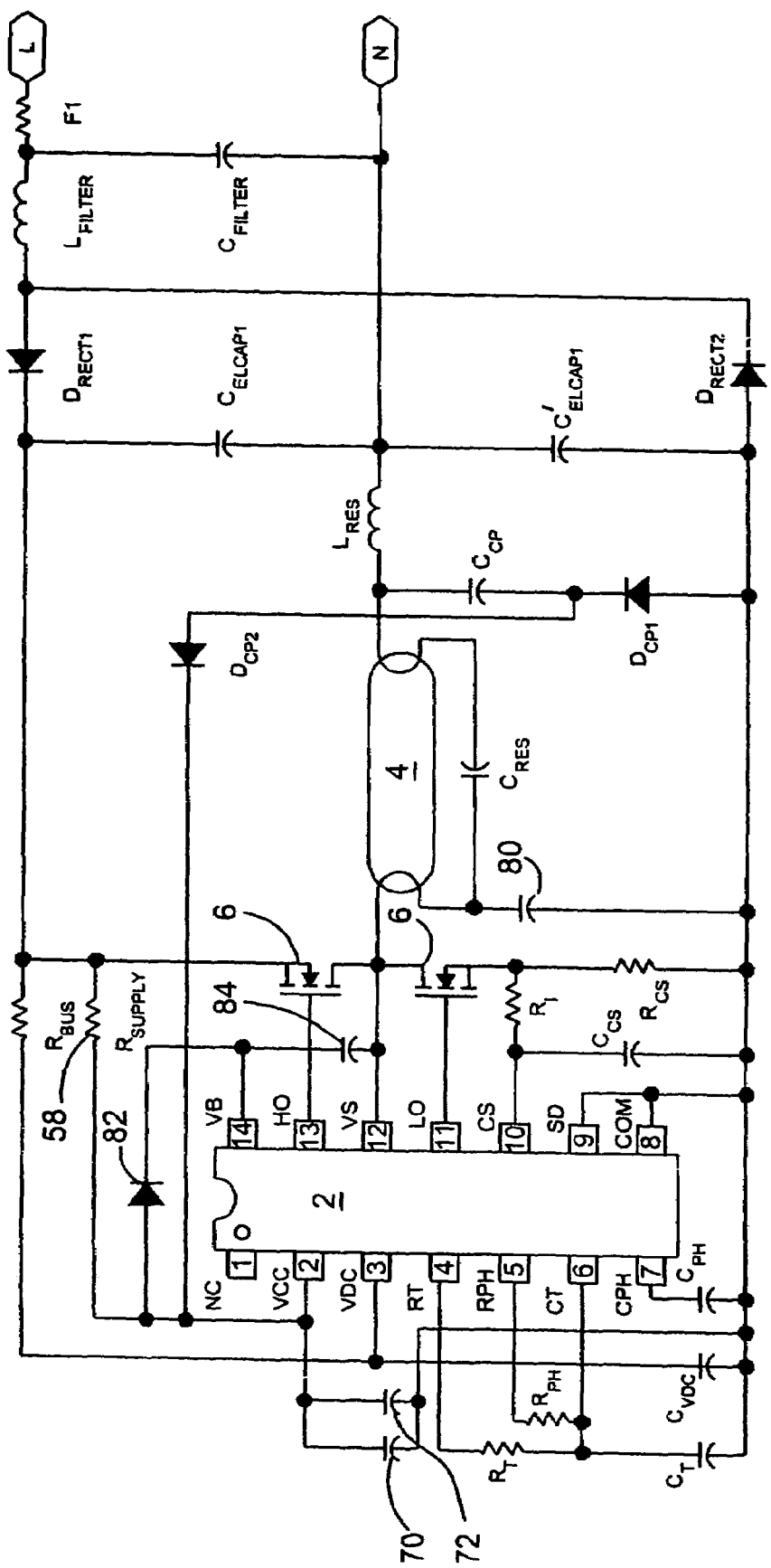
FIG. 2 is a typical connection diagram for driving a single fluorescent lamp with the ballast control circuit of the present invention.
Figure 3:
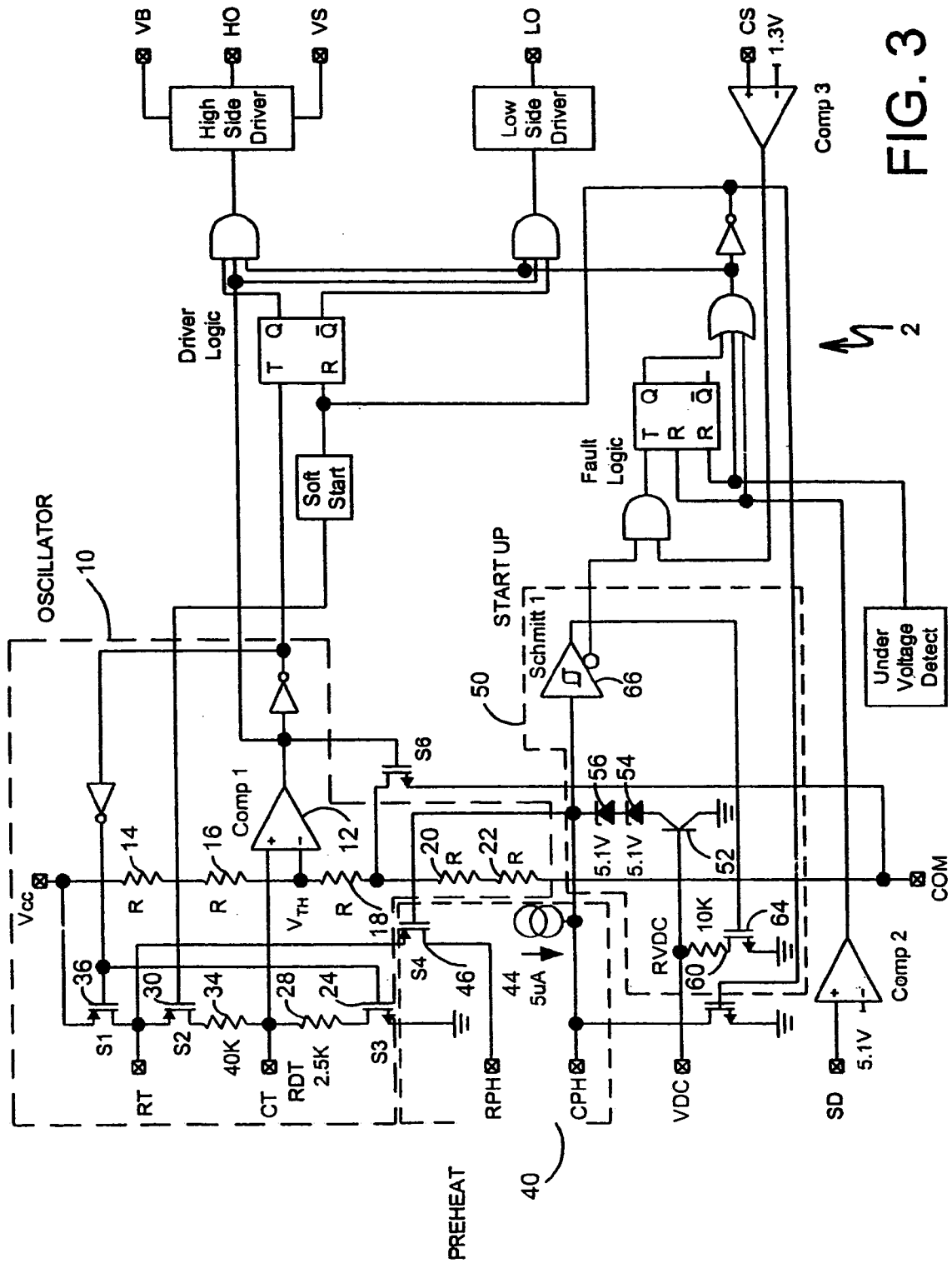
FIG. 3 illustrates a basic block diagram of the ballast control circuit of the present invention.
Figure 4:
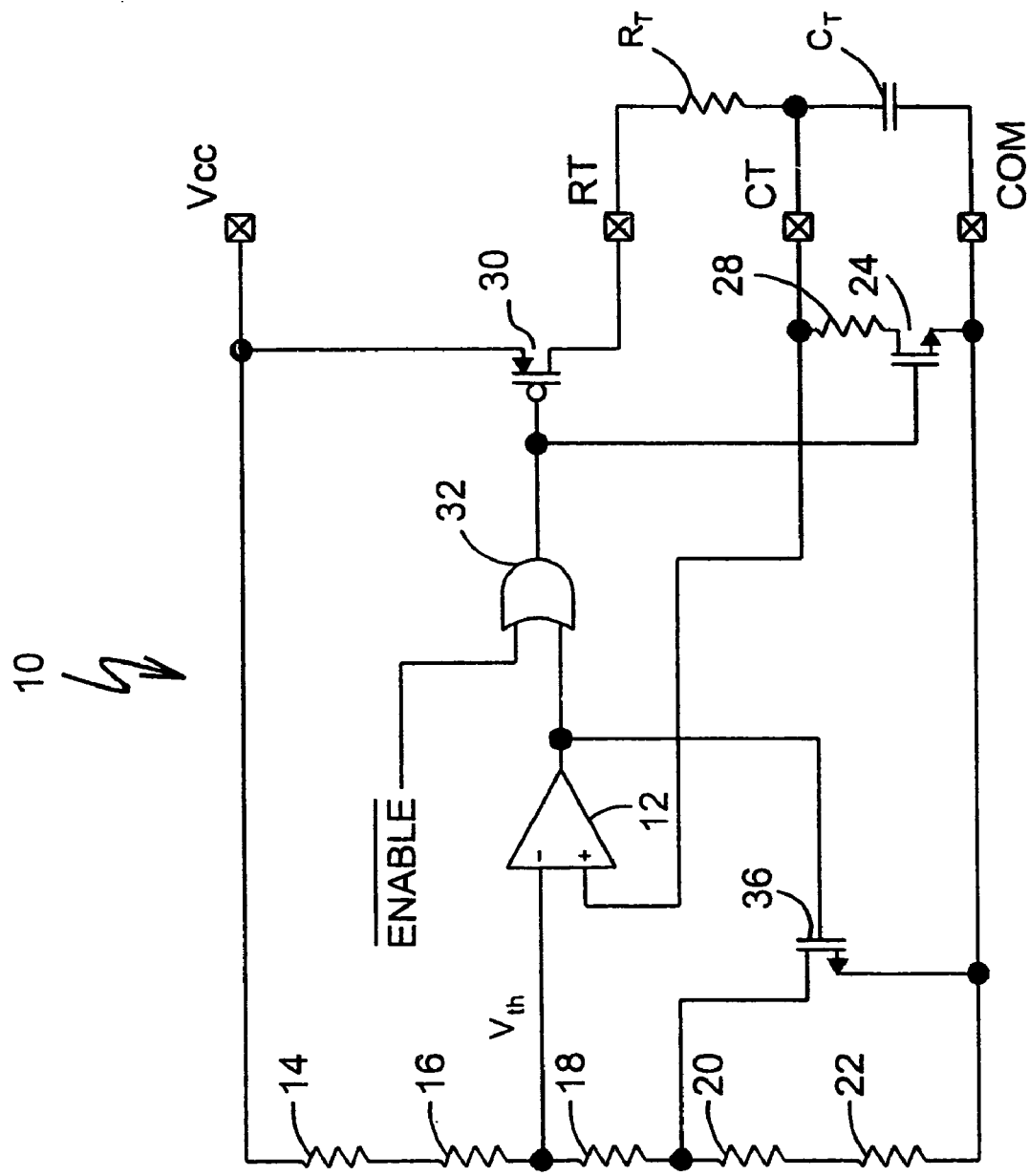
FIG. 4 is a detailed schematic of oscillator circuitry of the integrated ballast control circuit according to the present invention

Overview:

Referring first to FIG. 1, a state diagram is shown that is incorporated into the operation of the integrated circuit (IC) 2 of the present invention for controlling an electronic (rapid start) fluorescent lamp ballast. FIG. 2 illustrates a typical connection diagram for driving a single fluorescent lamp 4 with the integrated circuit 2 of the present invention. FIG. 3 illustrates a basic block diagram of the integrated circuit 2 of the present invention. Many of the aspects of the present invention shown in FIGS. 1-3 are similar to the disclosure of U.S. Pat. No. 6,211,623 to Wilhelm et al. issued Apr. 3, 2001 and incorporated herein by reference, and will be discussed further below. However, significant aspects and advantages of the present invention, particularly with respect to oscillator 10, preheat circuit 40 and start-up circuit 50 shown in FIG. 3, will be discussed, as follows:

Oscillator:

FIG. 4 is a detailed schematic of oscillator circuit 10 according to the present invention. In contrast to prior ballast ICs, the oscillator circuit advantageously requires only one comparator 12 and therefore significantly reduces the layout space required for implementation into silicon. Accordingly, the overall size of the IC can be reduced.

Operationally, the minus (−) input of comparator 12, Vth, initially is at ⅗ VCC, which is established by the voltage divider formed by five resistors 14, 16, 18, 20, and 22 of equal resistance connected in series between VCC and COM. The on/off control signal $\overline{\text{ENABLE}}$ is a logic 'high', therefore turning MOSFET 24 'on' which keeps the timing capacitor $C_T$ discharged to COM through dead-time resistor 28. Pin CT serves as the plus (+) input of comparator 12 and is initially at COM, therefore the output of comparator 12 is a logic 'low.'

Switch 30 is 'off' initially due to the output of OR gate 32 being 'high' when $\overline{\text{ENABLE}}$ is 'high.' Pin RT is therefore at the same potential as pin CT due to their connection through timing resistor $R_T$. Once $\overline{\text{ENABLE}}$ goes 'low' (see Timing Diagram, FIG. 7), MOSFET switch 24 is 'opened' and switch 30 is 'closed'. As a result, timing capacitor $C_T$ charges exponentially towards VCC through timing resistor $R_T$ at a rate given by the following equation:

$$V_{CT}(t) = VCC(1 - e^{-t/RC})$$

where,
R=resistance of timing resistor $R_T$ [Ohms]
C=capacitance of timing capacitor $C_T$ [Farads]
t=time [Seconds]

When the voltage on pin CT exceeds ⅗ VCC, the output of comparator 12 goes 'high' causing switch 36 to 'close,' switch 30 to 'open,' and switch 24 to 'close.' Timing capacitor $C_T$ then discharges exponentially towards COM through dead-time resistor 28 at a rate given by:

$$V_{CT}(t) = (\tfrac{3}{5}VCC)e^{-t/RC}$$

Closing switch 36 changes the threshold at pin CT from ⅗ VCC to ⅓ VCC. In doing so, inherent positive feedback forces the comparator output to transition quickly with a single edge. When capacitor $C_T$ discharges below ⅓ VCC, the output of comparator 12 goes 'low' again, and the cycle repeats itself.

This charging and discharging of CT between ⅗ VCC and ⅓ VCC continues indefinitely until the $\overline{\text{ENABLE}}$ signal goes once again 'high'. During steady state oscillations, the charging and discharge times are given as:

Charging: $V_{CT}(t) = (VCC - \tfrac{1}{3}VCC)(1 - e^{-t/RC \cdot CT})$

Discharging: $V_{CT}(t) = \tfrac{3}{5}VCC \, e^{-t/RT \cdot CT}$

Figure 7:
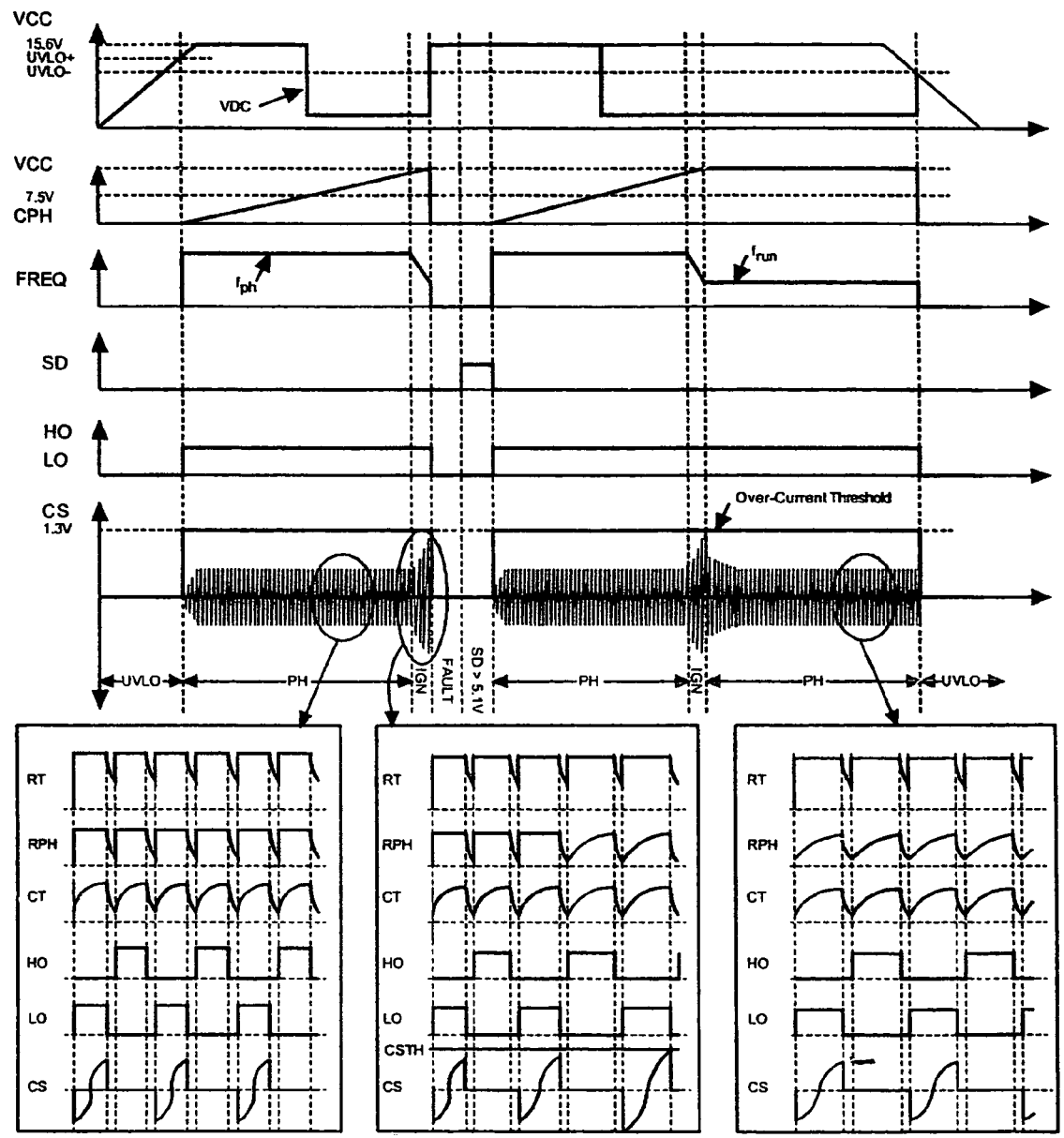
FIG. 7 is a timing diagram for the ballast control circuit of the present invention.

The charging time determines the 'on' time of gate drive signals HO and LO (see Timing Diagram, FIG. 7). The discharge time determines the dead-time between gate drive signals HO and LO (see Timing Diagram, FIG. 7). This preferred oscillator of the present invention results in less circuitry than oscillator circuits of previous ballast ICs, specifically requiring only one comparator. The oscillator is ratiometric with VCC and is therefore independent of VCC. The threshold values selected are arbitrary.

Preheat Timer and Ignition Ramp

Figure 5:
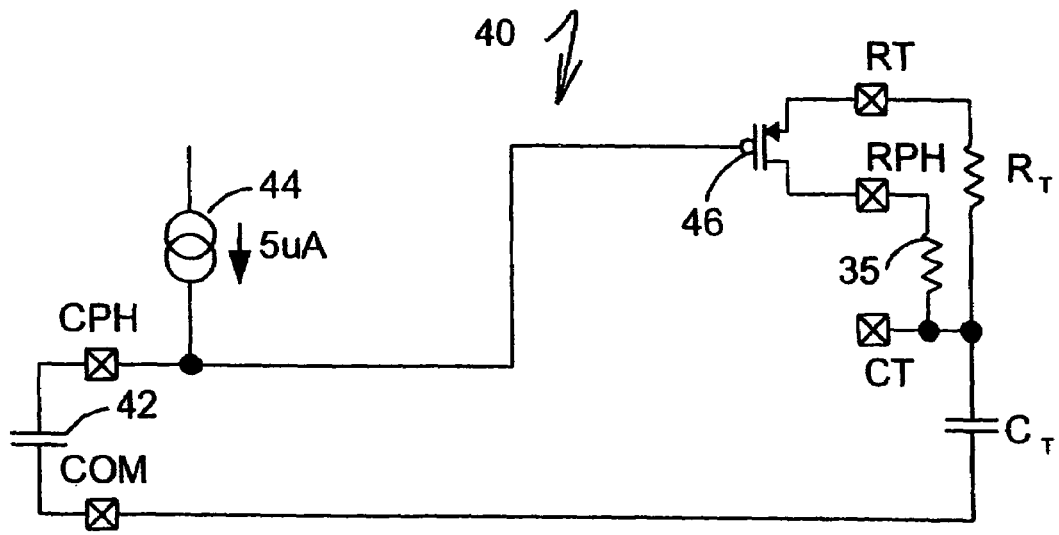
FIG. 5 is a schematic illustration of preheat circuitry according to a preferred embodiment of the present invention.

FIG. 5 is a schematic illustration of preheat circuit 40 according to a preferred embodiment of the present invention. Advantageously, preheat circuit 40 does not require any comparators.

During preheat, it is necessary for the IC to oscillate at a higher preheat frequency. This is followed by a smooth downward sweep through the ignition frequency to the final running or minimum frequency. To do this, an external capacitor $C_{PH}$ is charged linearly from COM to VCC through an internal 5 μA current source 44 flowing out of the CPH pin. The CPH pin is also connected to the gate of a PMOS transistor 46 which connects pin RPH to pin RT. In this configuration, resistor $R_T$ is connected in parallel with resistor $R_{PH}$ such that the oscillator frequency is higher during preheat. Since the threshold of the PMOS is about 1.5 volts, the preheat period is defined as the time it takes for capacitor $C_{PH}$ to ramp from COM to (VCC−1.5 volts). As capacitor $C_{PH}$ continues to charge from (VCC−1.5V) to VCC, switch 46 opens slowly, which slowly disconnects pin RPH from RT. This causes the frequency to transition slowly from the preheat frequency to the final running frequency. (See Timing Diagram, FIG. 7).

The advantageous features of preheat circuit 40 are: 1) using a resistor $R_{PH}$ parallel to resistor $R_T$ to program the preheat frequency; 2) ramping the voltage at the gate of PMOS 46 to disconnect the RPH pin smoothly from the RT pin; and 3) using the existing capacitor $C_{PH}$ ramp as the ramp for ignition as well. Classical implementation of the preheat timer requires a comparator for comparing the CPH pin against a fixed threshold. By combining the above-noted three functions in preheat circuit 40 of the present invention, a 'comparator-less' pre-heat timer is realized, thereby reducing the overall size of the IC.

Figure 6:
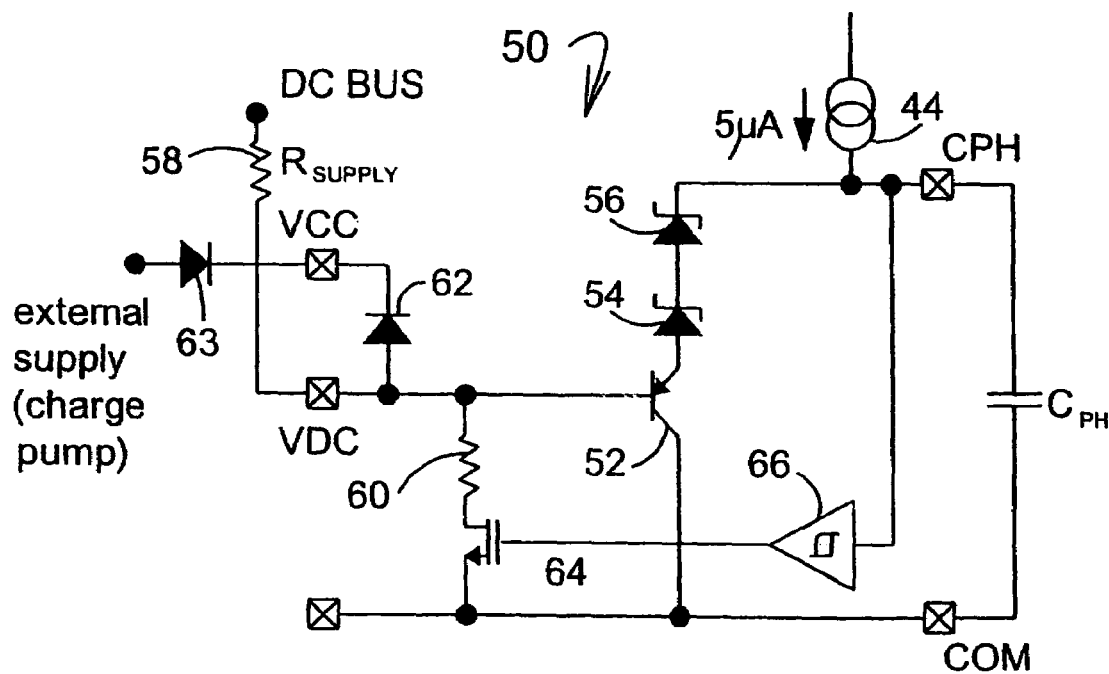
FIG. 6 is a schematic diagram of start-up and low DC bus frequency-shift reset circuitry of the integrated ballast control circuit of the present invention.

Start-up Circuitry and Low DC Bus Frequency-Shift Reset:

Start-up and low DC bus frequency-shift reset circuitry 50 is shown in the schematic of FIG. 6. The circuit senses the DC bus and properly resets the circuit back to preheat mode if the DC bus decreases below a level where the lamp can extinguish. Failure to do this can result in the lamp extinguishing during a brown-out line condition and not being re-ignited when the AC input returns. Decreasing the DC bus also can cause hard-switching at the half-bridge output which can damage or destroy the power MOSFETs or IGBTs. It is therefore convenient to increase the frequency as the DC bus decreases such that the ballast operating point always remains above resonance and no hard-switching occurs.

Circuit 50 of the present invention achieves this by using the VDC pin to sense the DC bus. If VDC decreases below (VCC−10.9V), the CPH pin is pulled down linearly with the VDC pin. This gradually will re-connect RPH with RT and therefore gradually shift the frequency higher.

The 10.9V threshold is achieved with a PNP transistor 52, and the two 5.1 zener diodes 54 and 56, connected in series. The base of transistor 52 is connected to pin VDC, the collector of transistor 52 is connected to COM, and the emitter is connected to the anode of the lower diode 54. The cathode of the upper diode is then connected to pin CPN. In this configuration, the frequency is not increased until VDC goes below the two zener voltages (10.2V) plus the emitter-to-base voltage of transistor 52 ($\approx 0.7$)=10.9V. FIG. 8 depicts this graphically.

To program the DC bus level at which the frequency shift occurs, an external resistor 58 ($R_{SUPPLY}$), with an internal resistor 60, form a voltage divided ratio of the DC bus at pin VDC. To further reduce external component count, resistor 58 also supplies micro-power start-up current to the IC. As the DC bus increases at ballast turn-on, current flows from the DC bus, through the resistor 58, into pin VDC, through the existing ESD diode 62 connected between VDC and VCC.

Once VCC exceeds the positive-going under-voltage lock-out threshold, UVLO (+), an external charge pump (or other form of supply) connected to VCC through an external diode 63 takes over as the supply for VCC and increases VCC up to the internal zener clamp voltage (see Timing Diagram, FIG. 7). Resistor 60 then is connected internally to pin VDC through MOSFET 64 when CPH exceeds the threshold voltage ($\approx \frac{1}{2}$ VCC) of Schmitt trigger 66. This occurs at approximately half way through the preheat time. The CPH pin is used as a convenient delay for connecting RVDC to pin VDC, which also contributes to reducing the overall size of the IC.

State Diagram

Referring back now to FIG. 1, the integrated circuit 2 of the present invention advantageously executes a very specific set of instructions to control the lamp 4 and protect the ballast. The IC accurately controls and properly performs the functions of: powering up and down the IC 2 and the half-bridge (MOSFETs 6 and 8); preheating and striking the lamp; running the lamp; sensing for numerous possible fault conditions; and recovering from these fault conditions based on normal lamp maintenance.

The state machine operates between five basic modes of operation based on the status of the various inputs to the IC. These five modes of operation include:
1) under voltage lockout mode;
2) preheat mode;
3) ignition ramp mode;
4) run mode; and
5) fault mode.

FIG. 2 illustrates the pinouts of the IC 2, including all of its inputs and outputs. The inputs to the chip include:
1) VCC
2) VDC
3) SD
4) CS
5) CPH
6) CT
7) RT VCC represents both an input to be sensed and the primary low voltage supply to the IC. In addition to these seven inputs, the IC surface junction temperature represents an eighth input. The outputs of the IC include:
1) HO
2) LO
3) RPH
4) RUN
5) DT The supplies to the IC include:
1) VCC
2) COM
3) VB
4) VS The general description for the IC functions of the present invention are as follows:

Under-voltage Lock-Out Mode (UVLO)

The under-voltage lock-out mode (UVLO) is defined as the state the IC is in when VCC is below the turn-on threshold of the IC. The undervoltage lock-out is designed to maintain an ultra low supply current of less than 150 uA, and to guarantee the IC is fully functional before the high and low side output drivers are activated. FIG. 1 shows an efficient supply voltage using the start-up current of the ballast IC together with a charge pump from the ballast output stage (resistor 58, capacitors 70, 72, $D_{CP1}$ and $D_{CP2}$).

The start-up capacitors 70, 72 ($C_{VCC}$) are charged by current through supply resistor 58 ($R_{SUPPLY}$) minus the start-up current drawn by the IC. Resistor 58 is connected to VCC internally through a diode, and is chosen to fulfill two functions. The first is to provide twice the maximum start-up current to guarantee ballast start-up at low line input voltage. The second is to set the IC reset threshold in case of a decreasing DC bus (described in more detail above). Once the capacitor voltage on VCC reaches the start-up threshold, and the SD pin is below 4.5 volts, the IC turns on and HO and LO begin to oscillate. Capacitors 70, 72 begin to discharge due to the increase in IC operating current.

During the discharge cycle, the rectified current from the charge pump charges the capacitor above the IC turn-off threshold. The charge pump and the internal 15.6V zener clamp of the IC take over as the supply voltage. The start-up capacitors 70, 72 and snubber capacitor 80 must be selected such that enough supply current is available over all ballast operating conditions. A bootstrap diode 82 and supply capacitor 84 comprise the supply voltage for the high side driver circuitry. To guarantee that the high-side supply is charged up before the first pulse on pin HO, the first pulse from the output drivers comes from the LO pin. During undervoltage lock-out mode, the high- and low-side driver outputs HO and LO are both low, pin CT is connected internally to COM to disable the oscillator, and pin CPH is connected internally to COM for resetting the preheat time.

Preheat Mode (PH)

The preheat mode is defined as the state the IC is in when the lamp filaments are being heated to their correct emission temperature. This is necessary for maximizing lamp life and reducing the required ignition voltage. The ballast control IC enters preheat mode when VCC exceeds the UVLO positive-going threshold. HO and LO begin to oscillate at the preheat frequency with 50% duty cycle and with a dead-time which is set by the value of the external timing capacitor $C_T$, and internal deadtime resistor, RDT. Pin CPH is disconnected from COM and an internal 1 uA current source (FIG. 3) charges the external preheat time capacitor on CPH linearly. The over-current protection on pin CS is disable during preheat. The preheat frequency is determined by the parallel combination of resistors $R_{PH}$ and $R_T$, together with timing capacitor $C_T$. Capacitor $C_T$ charges and discharges between $\frac{1}{3}$ and $\frac{2}{3}$ of VCC (see Timing Diagram, FIG. 7). $C_T$ is charged exponentially through the parallel combination of $R_T$ and $R_{PH}$ connected internally to VCC through MOSFET 36. The charge time of $C_T$ from $\frac{1}{3}$ and $\frac{2}{3}$ VCC is the on-time of the respective output gate driver, HO or LO. Once CT exceeds $\frac{2}{3}$ VCC, MOSFET 36 is turned off, disconnecting RT and RPH from VCC. Capacitor $C_T$ then is discharged exponentially through an internal resistor, RDT, through MOSFET 24 to COM. The discharge time of timing capacitor $C_T$ from $\frac{2}{3}$ to $\frac{1}{3}$ VCC is the dead-time (both off) of the output gate drivers, HO and LO. The selected values of capacitor $C_T$ together with RDT (resistor 28) therefore program the desired dead-time (see Design Equations 1 and 2). Once capacitor $C_T$ discharges below ⅓ VCC, MOSFET 24 is turned off, disconnecting RDT from COM, and MOSFET 36 is turned on, connecting RT and RPH again to VCC. The frequency remains at the present frequency until the voltage on pin CPH exceeds 13V and the IC enters Ignition Mode. During the preheat mode, both the over-current protection and the DC bus under-voltage reset are enabled when pin CPH exceeds 7.5V.

Ignition Mode (IGN)

The ignition mode is defined as the state the IC is in when a high voltage is being established across the lamp necessary for igniting the lamp. The ballast control IC enters ignition mode when the voltage on pin CPH exceeds 13V.

Pin CPH is connected internally to the gate of a p-channel MOSFET 46 of preheat circuit 40 (see FIG. 5) that connects pin RPH with pin RT. As pin CPH exceeds 13V, the gate-to-source voltage of MOSFET 46 begins to fall below the turn-on threshold of MOSFET 46. As pin CPH continues to ramp towards VCC, MOSFET switch 46 turns off slowly. This results in preheat resistor $R_{PH}$ being disconnected smoothly from timing resistor $R_T$, and therefore causing the operating frequency to ramp smoothly from the preheat frequency, through the ignition frequency, to the final run frequency. The over-current threshold on pin CS will protect the ballast against a non-strike or open-filament lamp fault condition. The voltage on pin CS is defined by the lower half-bridge MOSFET current flowing through the external current sensing resistor $R_{CS}$. Current sensing resistor $R_{CS}$ therefore programs the maximum allowable peak ignition current (and therefore peak ignition voltage) of the ballast output stage. The peak ignition current must not exceed the maximum allowable current ratings of the output stage MOSFETs. If this voltage exceeds the internal threshold of 1.3V, the IC will enter FAULT mode and both gate driver outputs HO and LO will be latched low.

Run Mode (RUN)

Once the lamp has successfully ignited, the ballast enters the run mode. The run mode is defined as the state the IC is in when the lamp arc is established and the lamp is being driven to a given power level. The run mode oscillating frequency is determined by the timing resistor $R_T$ and timing capacitor $C_T$ (see Design Equations 3 and 4 in the following section). Should hard-switching occur at the half-bridge at any time due to an open-filament or lamp removal, the voltage across the current sensing resistor $R_{CS}$ will exceed the internal threshold of 1.3 volts and the IC will enter FAULT mode. Both gate driver outputs, HO and LO, will be latched low.

DC Bus Under-voltage Reset:

If the voltage of the DC bus decreases too far during a brown-out line condition or over-load condition, the resonant output stage to the lamp can shift near or below resonance. This can produce hard-switching at the half-bridge which can damage the half-bridge switches. To protect against this, pin VDC measures the DC bus voltage and pulls down on pin CPH linearly as the voltage on pin VDC decreases 10.9V below VCC. This causes the p-channel MOSFET 46 (FIG. 4) to close as the DC bus decreases and the frequency to shift higher to a safe operating point above resonance. The DC bus level at which the frequency shifting occurs is set by the external resistor 58 and internal RVDC resistor. By pulling down on pin CPH, the ignition ramp is also reset. Therefore, should the lamp extinguish due to very low DC bus levels, the lamp will be automatically ignited as the DC bus increases again. The internal RVDC resistor is connected between pin VDC and COM when CPH exceeds 7.5V (during preheat mode). This allows for resistor 58 to serve also as the start-up resistor for the IC, therefore minimizing component count.

Fault Mode (FAULT)

If the voltage at the current sensing pin, CS, exceeds 1.3 volts at any time after the preheat mode, the IC enters fault mode and both gate driver outputs, HO and LO, are latched in the 'low' state. CPH is discharged to COM to reset the preheat time, and CT is discharged to COM for disabling the oscillator. To exit the fault mode, VCC must be recycled back below the UVLO negative-going turn-off threshold, or, the shutdown pin, SD, must be pulled above 5.1 volts. Either of these conditions will force the IC to enter UVLO mode (see State Diagram, page 2). Once VCC is above the turn-on threshold and SD is below 4.5 volts, the IC will begin oscillating again in the preheat mode.

Design Equations

The design equations for implementing the ballast IC of the present invention are as follows:

Step 1: Program Dead-time

The dead-time between the gate driver outputs HO and LO is programmed with timing capacitor CT and internal dead-time resistor 28 (see FIG. 4). The dead-time is the discharge time of capacitor CT from ⅗ VCC to ⅓ VCC and is given as:

$$t_{DT} = C_T \cdot 1475 \; [\text{Seconds}] \quad (1)$$

or $$C_T = \frac{t_{TD}}{1475} \; [\text{Farads}] \quad (2)$$

Step 2: Program Run Frequency

The final run frequency is programmed with timing resistor $R_T$ and timing capacitor $C_T$. The charge time of capacitor $C_T$ from ⅓ VCC to ⅗ VCC determines the on-time of HO and LO gate driver outputs. The run frequency is therefore given as:

$$f_{RUN} = \frac{1}{2 \cdot C_T(0.51 \cdot R_T + 1475)} \; [\text{Hertz}] \quad (3)$$

or $$R_T = \frac{1}{1.02 \cdot C_T \cdot f_{RUN}} - 2892 \; [\text{Ohms}] \quad (4)$$

Step 3: Program Preheat Frequency

The preheat frequency is programmed with timing resistor $R_T$ and preheat resistor $R_{PH}$ and timing capacitor $C_T$. Timing resistor $R_T$ and preheat resistor $R_{PH}$ are connected in parallel internally for the duration of the preheat time. The preheat frequency is therefore given as:

$$f_{PH} = \frac{1}{2 \cdot C_T \cdot \left( \frac{0.51 \cdot R_T \cdot R_{PH}}{R_T + R_{PH}} + 1475 \right)} \; [\text{Hertz}] \quad (5)$$

or $$R_{PH} = \frac{\left( \frac{1}{1.02 \cdot C \cdot f_{PH}} - 2892 \right) \cdot R_T}{R_T - \left( \frac{1}{1.02 \cdot C_T \cdot f_{PH}} - 2892 \right)} \; [\text{Ohms}] \quad (6)$$

Step 4: Program Preheat Time

The preheat time is defined by the time it takes for capacitor $C_{PH}$ on pin $C_{PH}$ to charge up to 13 volts. An internal current source of 5 µA flows out of pin $C_{PH}$. The preheat time is therefore given as:

$$t_{PH} = C_{PH} \cdot 2.6e6 \text{[Seconds]} \quad (7)$$

or $$C_{PH} = t_{PH} \cdot 0.385e-6 \text{[Farads]} \quad (8)$$

Step 5: Program Maximum Ignition Current

The maximum ignition current is programmed with the external resistor RCS and an internal threshold of 1.3 volts. This threshold determines the over-current limit of the ballast, which can be exceeded when the frequency ramps down towards resonance during ignition and the lamp does not ignite. The maximum ignition current is given as:

$$I_{IGN} = \frac{1.3}{R_{cs}} \text{ [Amps Peak]} \quad (9)$$

or $$R_{cs} = \frac{1.3}{I_{IGN}} \text{ [Ohms]} \quad (10)$$

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A ballast control IC comprising an oscillator circuit and a preheat circuit, wherein the preheat circuit controls a preheat frequency of said oscillator circuit, and wherein the preheat frequency is programmed using an external pre-heat resistor in parallel with a timing resistor connected to said oscillating circuit, the preheat resistor being gradually disconnected so as to gradually change a timing parameter applied to said oscillating circuit and thereby gradually change a frequency of said oscillating circuit as the ballast control IC enters a run mode in which said oscillator operates with a run frequency, following a pre-heat period in which said oscillator operates with a preheat frequency which is higher than said run frequency.

2. The ballast control IC of claim 1, the oscillator circuit including only one comparator such that a smaller layout space is required and the overall size of the IC is reduced.

3. The ballast control IC as recited in claim 1, wherein the preheat circuit generates a preheat voltage ramp to determine the preheat period, and the preheat voltage ramp is also used as an ignition ramp.

4. The ballast control IC of claim 1, wherein the preheat circuit does not include a comparator.

5. The ballast control IC according to claim 1, wherein the oscillator circuitry further comprises a capacitor coupled to the one comparator and operable to be charged and discharged to influence operation of the one comparator.

6. The ballast control IC according to claim 5, further comprising a threshold voltage applied to the one comparator being selectively varied in dependence upon the charging or discharging of the capacitor.

7. The ballast control IC of claim 1, wherein the preheat circuit generates a preheat voltage ramp to determine the preheat period.

8. A ballast control IC with a preheat function, comprising:

a switch coupled to a current source and operable to gradually change state to gradually change an external resistance which applies a timing parameter to an oscillating circuit to control a frequency of said oscillating circuit in accordance with said preheat function, based on a voltage derived from the current source;

a circuit for charging and discharging an external capacitor and coupled to the external resistance, whereby the gradually changing resistance gradually modifies a charging/discharging frequency of the circuit and thereby modified said frequency of said oscillating circuit in accordance with said preheat function; and a switching control coupled to the circuit and operable to provide a switching signal to the oscillating circuit at the gradually modified frequency to provide said preheat function.

9. The ballast control IC according to claim 8, further comprising an external capacitor coupled to the current source to provide a gradually changing voltage applied to the switch.

10. A method for providing a preheat function in a ballast control IC, comprising:

applying a current source to an energy source element to provide a gradually changing parameter dependent on the element;

gradually switching a resistance between a first and second value based on the gradually changing parameter;

applying the gradually changing resistance to an oscillator circuit, where the gradually changing resistance influences a frequency of the oscillator circuit such that the frequency gradually changes; and applying the gradually changing frequency to a switching circuit to obtain a preheat function.

* * * * *